(12) United States Patent
Madanayake

(10) Patent No.: US 12,170,550 B2
(45) Date of Patent: Dec. 17, 2024

(54) SYSTEMS AND METHODS FOR WIRELESS SIMULTANEOUS TRANSMIT AND RECEIVE OPERATION

(71) Applicant: Habarakada Liyanachchi Prabath Arjuna Madanayake, Miami, FL (US)

(72) Inventor: Habarakada Liyanachchi Prabath Arjuna Madanayake, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 18/438,914

(22) Filed: Feb. 12, 2024

(65) Prior Publication Data

US 2024/0291525 A1 Aug. 29, 2024

Related U.S. Application Data

(60) Provisional application No. 63/486,616, filed on Feb. 23, 2023.

(51) Int. Cl.
| | |
|---|---|
| H04B 7/04 | (2017.01) |
| H04B 1/16 | (2006.01) |
| H04B 1/40 | (2015.01) |
| H04B 7/0426 | (2017.01) |

(52) U.S. Cl.
CPC ......... *H04B 7/0426* (2013.01); *H04B 1/1607* (2013.01); *H04B 1/40* (2013.01)

(58) Field of Classification Search
CPC ....... H04B 7/0426; H04B 1/1607; H04B 1/40
See application file for complete search history.

(56) References Cited

U.S. PATENT DOCUMENTS

| | | | | |
|---|---|---|---|---|
| 2015/0146765 A1* | 5/2015 | Moffatt | ............... | H04B 1/40 |
| | | | | 375/219 |
| 2019/0304936 A1* | 10/2019 | Shaul | ............... | H01L 24/20 |
| 2022/0140499 A1* | 5/2022 | Naraine | ............... | H01Q 1/246 |
| | | | | 343/797 |

OTHER PUBLICATIONS

Wikipedia, Butler matrix, https://en.wikipedia.org/wiki/Butler_matrix (viewed on Jul. 13, 2024) (Year: 2024).*
Wikipedia, Luneburg lens, https://en.wikipedia.org/wiki/Luneburg_lens (viewed on Jul. 13, 2024) (Year: 2024).*
Wikipedia, Rotman lens, https://en.wikipedia.org/wiki/Rotman_lens (viewed on Jul. 13, 2024) (Year: 2024).*

(Continued)

*Primary Examiner* — Nader Bolourchi
(74) *Attorney, Agent, or Firm* — SALIWANCHIK, LLOYD & EISENSCHENK

(57) ABSTRACT

Systems and methods for wireless simultaneous transmit and receive (STAR) using multi-input multi-output (MIMO) radiofrequency (RF) front-ends are provided. A MIMO front-end can be based on the use of a symmetrical pair of arrays, in which one is used for communication while the other is used inside an RF-shielded chamber to act as a reference for subtracting self-interference between transmitters and receivers. In addition to the two arrays, the symmetry of the system can include two identical passive microwave multi-beam beamforming networks. The beamformer networks can be, for example, Butler Matrix based, true-time delay microwave networks, or Rotman lens based.

2 Claims, 4 Drawing Sheets

(56) References Cited

OTHER PUBLICATIONS

Haixiang Zhao et al., A Broadband Multistage Self-Interference Canceller for Full-Duplex MIMO Radios, IEEE Transactions On Microwave Theory and Techniques, vol. 69, No. 4, Apr. 2021, 14 pages.
Udara De Silva et al., A Comparison of AI-enabled Digital Twins for DSP-based Self-Interference Cancellation in Wideband Full-Duplex Communications, ICEAA-IEEE APWC-USNC URSI RSM 2021, Honolulu, Hawaii, USA Aug. 9-13, 2021, 1 page.
Peyman Dehghanzadeh et al., A Multiport Self-Interference Canceller for Wideband SIMO/MIMO-STAR Full-Duplex Arrays, IEEE Transactions On Microwave Theory and Techniques, vol. 72, No. 4, Apr. 2024, 15 pages.
W. Rotman et al., Wide-Angle Microwave Lens for Line Source Applications, IEEE Transactions on Antennas and Propagation, vol. 11, No. 6 pp. 623-632, 1963, 10 pages.

\* cited by examiner

SYSTEMS AND METHODS FOR WIRELESS SIMULTANEOUS TRANSMIT AND RECEIVE OPERATION

CROSS-REFERENCE TO RELATED APPLICATION

This application claims the benefit of U.S. Provisional Application Ser. No. 63/486,616 filed Feb. 23, 2023, the disclosure of which is hereby incorporated by reference in its entirety, including all figures, tables, and drawings.

BACKGROUND

The electromagnetic radio spectrum is a finite natural resource. However, the demand for wireless communication services is constantly increasing. As a result, available radio spectrum in the sub-20 gigahertz (GHz) bands is becoming increasingly scarce. Spectral scarcity is important because it limits the ability of wireless communication systems to provide reliable and high-quality service. Although millimeter (mm)-wave spectrum at frequencies above 20 GHz is abundant, and the long-term future of wireless depends on moving many wireless applications to such to mm-wave bands.

BRIEF SUMMARY

Embodiments of the subject invention provide novel and advantageous systems and methods for wireless simultaneous transmit and receive (STAR) using multi-input multi-output (MIMO) radiofrequency (RF) front-ends. A MIMO front-end can be based on the use of a symmetrical pair of arrays, in which one is used for communication while the other is used inside an RF-shielded chamber (e.g., an RF-shielded anechoic chamber) to act as a reference for subtracting self-interference between transmitters and receivers. In addition to the two arrays, the symmetry of the system can include two identical passive microwave multi-beam beamforming networks. The beamformer networks can be, for example, Butler Matrix based, true-time delay microwave networks, or Rotman lens based, though embodiments are not limited thereto. The use of the multi-beam beamformers allow transmit beamforming, improvement in received signal-to-noise ratio (SNR), and interference rejection, as well as reduction of self-interference due to reflections in the environment. The system can include differential mode receivers that linearly subtract two sets of signals, from the communications array and from the reference array, such that near-field coupling induced self-interference as well as far-field environmental reflections are both reduced. The differential-mode connection allows cancellation of self-interference arising from near-field mutual coupling in the arrays, the leakage coupling inside the multi-beam beamformer networks, and any RF leakages in non-ideal microwave components, such as circulators or splitters used in the MIMO front-end.

In an embodiment, a system for wireless STAR can comprise at least one MIMO RF front-end, and each MIMO RF front-end can comprise: an RF-shielded chamber (e.g., an RF-shielded anechoic chamber); and a symmetrical pair of arrays comprising a first array configured for communication and a second array symmetrical to the first array and disposed within the RF-shielded chamber. The second array (of each front-end) can be configured as a reference for subtracting self-interference between transmitters and receivers of the system. Each MIMO RF front-end can further comprise at least one multi-beam beamforming network in operable communication with the symmetrical pair of arrays. Each multi-beam beamforming network of the at least one multi-beam beamforming network can be a passive microwave multi-beam beamforming network. The at least one multi-beam beamforming network can comprise a first multi-beam beamforming network and a second multi-beam beamforming network identical to the first multi-beam beamforming network. Each multi-beam beamforming network can be, for example, a Butler-Matrix based true-time delay microwave network, a Rotman lens based microwave network, or a Luneberg lens based microwave network. Each multi-beam beamforming network can comprise a circulator and/or a differential connection connected to each beam port thereof. Each multi-beam beamforming network can comprise a 180 hybrid coupler connected to each beam port thereof. The system can further comprise one or more power amplifiers (PAs) and/or low-noise amplifiers (LNAs) (e.g., each front-end can include one or more PAs and/or LNAs; see also, e.g., FIGS. 1 and 2).

In another embodiment, a method for wireless STAR can comprise: providing a system for wireless STAR as disclosed herein (e.g., including any or all of the features discussed in the previous paragraph); and utilizing the system to wirelessly transmit and receive signals simultaneously. The method can further comprise utilizing the second array (of each front-end) as a reference for subtracting self-interference between transmitters and receivers of the system.

DETAILED DESCRIPTION

Figure 1:
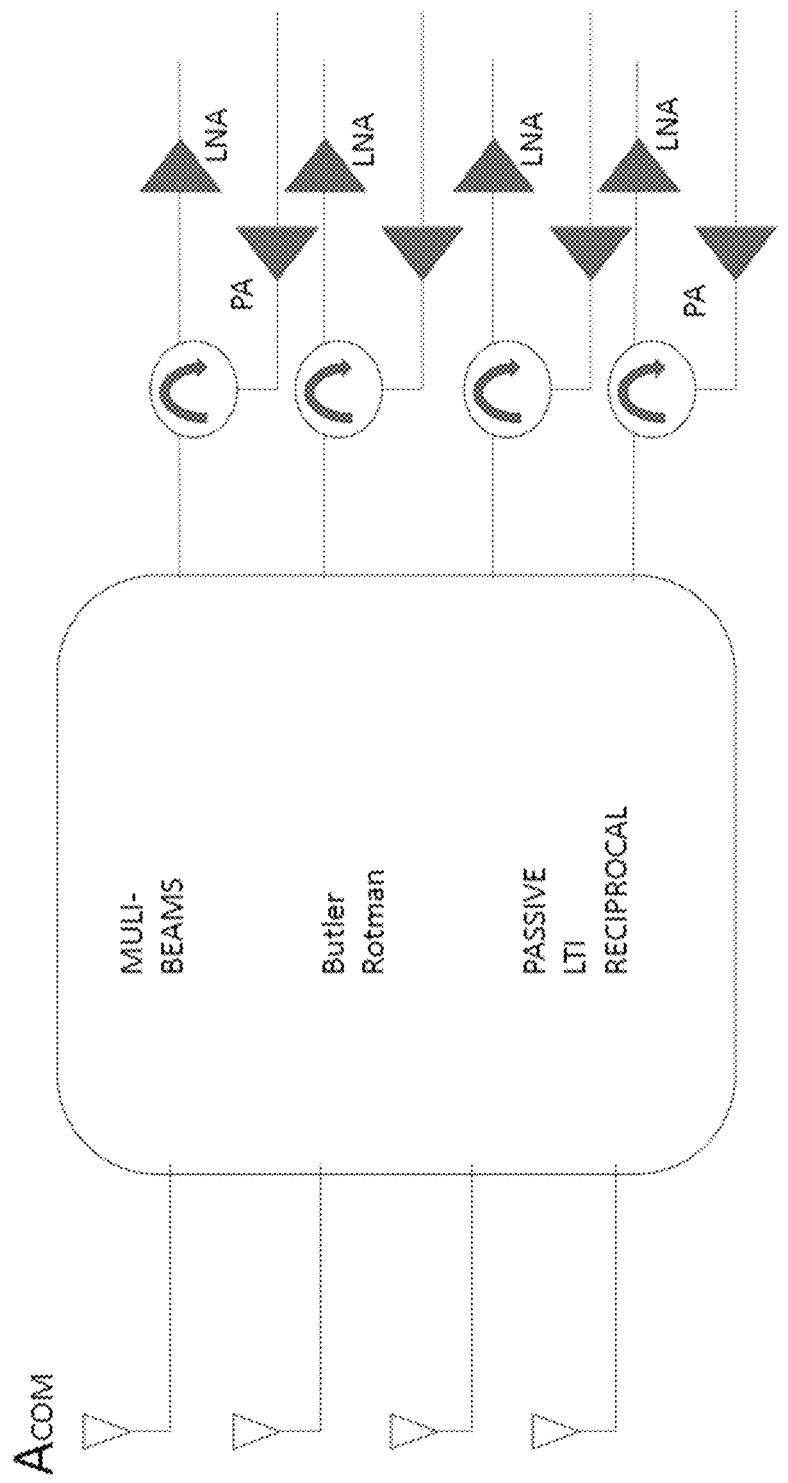
FIG. 1 shows a diagram of a multi-beam beamspace network with circulators for simultaneous transmit and receive (STAR) operation, according to an embodiment of the subject invention. A single array can be used for STAR communications, with one multi-beam microwave network, and N circulators for N beam ports (where N is an integer). The multi-beam network supports bi-directional beamforming and can typically be a passive microwave circuit.

Embodiments of the subject invention provide novel and advantageous systems and methods for wireless simultaneous transmit and receive (STAR) using one or more multi-input multi-output (MIMO) radiofrequency (RF) front-ends. A MIMO front-end can be based on the use of a symmetrical pair of arrays, in which one is used for communication while the other is used inside an RF-shielded chamber (e.g., an RF-shielded anechoic chamber) to act as a reference for subtracting self-interference between transmitters and receivers. In addition to the two arrays, the symmetry of the system can include two identical passive microwave multi-beam beamforming networks. The beamformer networks can be, for example, Butler Matrix based, true-time delay microwave networks, or Rotman lens based, though embodiments are not limited thereto. The use of the multi-beam beamformers allow transmit beamforming, improvement in received signal-to-noise ratio (SNR), and interference rejection, as well as reduction of self-interference due to reflections in the environment. The system can include differential mode receivers that linearly subtract two sets of signals, from the communications array and from the reference array, such that near-field coupling induced self-interference as well as far-field environmental reflections are both reduced. The differential-mode connection allows cancellation of self-interference arising from near-field mutual coupling in the arrays, the leakage coupling inside the multi-beam beamformer networks, and any RF leakages in non-ideal microwave components, such as circulators or splitters used in the MIMO front-end.

The legacy frequencies in FRI and FR3 bands up to about 20 gigahertz (GHz) remain extremely important for communications due to favorable physics for highly-scattering urban environments. For example, sub-6 GHz signals in the FRI frequency band incur low pass loss, making conditions optimum for urban signal coverage for cellular networks. As a consequence, there is and always will be a demand for the sub-6 GHz spectral band from commercial, public safety, and military systems. In order to partially address the demands for more and more spectrum, there is growing interest in the so-called FR3 band, running from 6 GHz to 20 GHz. Taken together, the frequency bands up to 20 GHz are of great interest for medium-term wireless system innovations within the next 20 years.

In-band (IB) full-duplex (FD) radios can STAR two different information-carrying signals over the same bandwidth, thus effectively doubling the bandwidth of operation and the capacity of the wireless channel. Such a doubling of capacity is a tremendous advantage for wireless communications in scarce spectral bands. Nevertheless, there are a number of real-world challenges that wireless communications and networking companies may face when trying to commercialize full-duplex STAR solutions. Some of these challenges include interference and range. With respect to interference, IB FD communication requires that the transmitter (Tx) and receiver (Rx) operate at the same frequency, which can lead to interference between the transmitted and received signals. This is the primary technical challenge of STAR communication system design. The self-interference can be especially challenging in crowded spectrum environments where there is limited bandwidth available. With respect to range, FD communication typically has a limited range due to the high levels of self-interference that can occur when the transmitted and received signals are at the same frequency. This is due to the fact that the self-interference power can be very high thereby completely saturating the receiver, thereby rendering it unable to receive the desired signal from the remote equipment. This can be a challenge for applications that require long-range communication, which implies high transmit power and low receive power due to long propagation distances.

Embodiments of the subject invention can enhance system capacity for wireless communications under increasingly contested and/or congested RF spectrum. FD wireless systems have the potential to be used in a wide range of applications beyond conventional modes of wireless communication, and STAR offers the potential to improve the performance and efficiency of future wireless systems.

There are advantages to having multiple antennas on a radio. Multi-antenna (array) radios can use directional beamforming, MIMO schemes, or hybrids between beamforming and MIMO. Beamforming provides directed gain by maximization of the signal-to-interference-and-noise ratio (SINR), and MIMO increases capacity by diagonalization of the channel matrix. If the available capacity is to be doubled in an array-based wireless system, the bandwidth must be doubled. Because spectral resources are scarce, an approach to doubling capacity according to embodiments of the subject invention can include moving to FD mode for all the antennas in the array. However, extending a single-antenna FD radio to an array-based STAR wireless system is challenging because the transmit signal from a given antenna will radiate out and couple to all other antennas. Each antenna is generally connected to a circulator-based duplexer to allow FD operation, which non-advantageously means that the coupled signals appear in the forward paths of the receivers. These coupled signals cause self-interference as they couple into the neighboring receivers. Self-interference due to such inter-element coupling between antennas in an array cannot be removed even if the circulators are ideal in their microwave characteristics.

Thus, inter-element mutual coupling dictates that FD communications are only possible using a single antenna, unless two separate arrays are used for transmit and receive functions with a significant distance between them to ensure that self-interference is sufficiently low. In such a system, the presence of two dedicated antenna arrays necessitates each array to operate in half-duplex (HD) mode. Further, the physical separation required between the two HD arrays has to be quite large for real-world wireless communications.

The fundamental problem in antenna engineering for FD arrays is mutual coupling between the array elements, which results in very high self-interference due to leakage of transmit signals into the receive paths of the coupled antenna elements. The problem is accentuated by the low-noise amplifier (LNA) and other high-gain amplifiers present at each receiver port; these amplify the mutually-coupled self-interference components by the receiver gain, which can be 90 decibels (dB) or more in sensitive wireless systems. The minimization of such mutually-coupled self-interference in FD MIMO arrays designed to support STAR wireless communications is a problem that is not solved in the related art and that persists even when each antenna in the array is coupled to its receiver and transmitter via an ideal circulator. The main point is that the interference from coupled transmit antennas in FD arrays cannot be blocked using ideal 3-port circulators.

Embodiments of the subject invention can solve the problem of self-interference between transmitters and receivers in an N-element antenna array configuration using a combination of novel self-interference cancellation (SIC) methods. Embodiments of the subject invention provide at least the following advantages: cancellation of self-interference due to near-field mutual coupling effects on the antenna array across a very wideband; improvement of environmental reflections and the resulting self-interference by a minimum of 13.5 dB, and much more for some directions of propagation; native support of beam-space MIMO via wideband multi-beam capability with no additional circuit complexity or power consumption due to passive realization in microwave circuitry; highly linear and time-invariant electrical behavior; extremely wideband and support for any number of antennas in the MIMO system; support for both circulator-based STAR and other microwave components that do not utilize circulation for achieving STAR operations; and providing of up to 10 log N of additional transmit and receive SNR gain and a minimum of 13.5 dB in directional interference rejection.

In one embodiment, a multi-beam beamspace network with circulators for STAR operation can be used, as depicted in FIG. 1. This is the most straightforward embodiment, which utilizes a wideband multi-beam beamforming network realized as a passive microwave circuit for reducing the self-interference due to environmental reflections. The use of the passive multi-beam microwave network, which can be for example a Rotman lens or Luneberg lens for wideband systems or a Butler matrix for lower bandwidth systems, allows the realization of beamspace MIMO. FD STAR operation is achieved by connecting a circulator to each of the beam ports so that the beamformer microwave network operates in reciprocal mode, supporting both forward- and backward-going RF waves. As a result, the configuration allows a single Rotman lens, Luneberg lens, or Butler Matrix, or any other multi-beam network, to allow STAR operation using a series of circulators for separating the transmit and receive signals. The multi-beam network can be connected on one end to the array (designated in the figure as "$A_{COM}$") used for communications. The beam ports can be bidirectional in nature and can be connected to N circulators (where N is an integer), thereby allowing N independent transmit paths and N independent receive paths to be obtained for beamspace MIMO operation.

Figure 2:
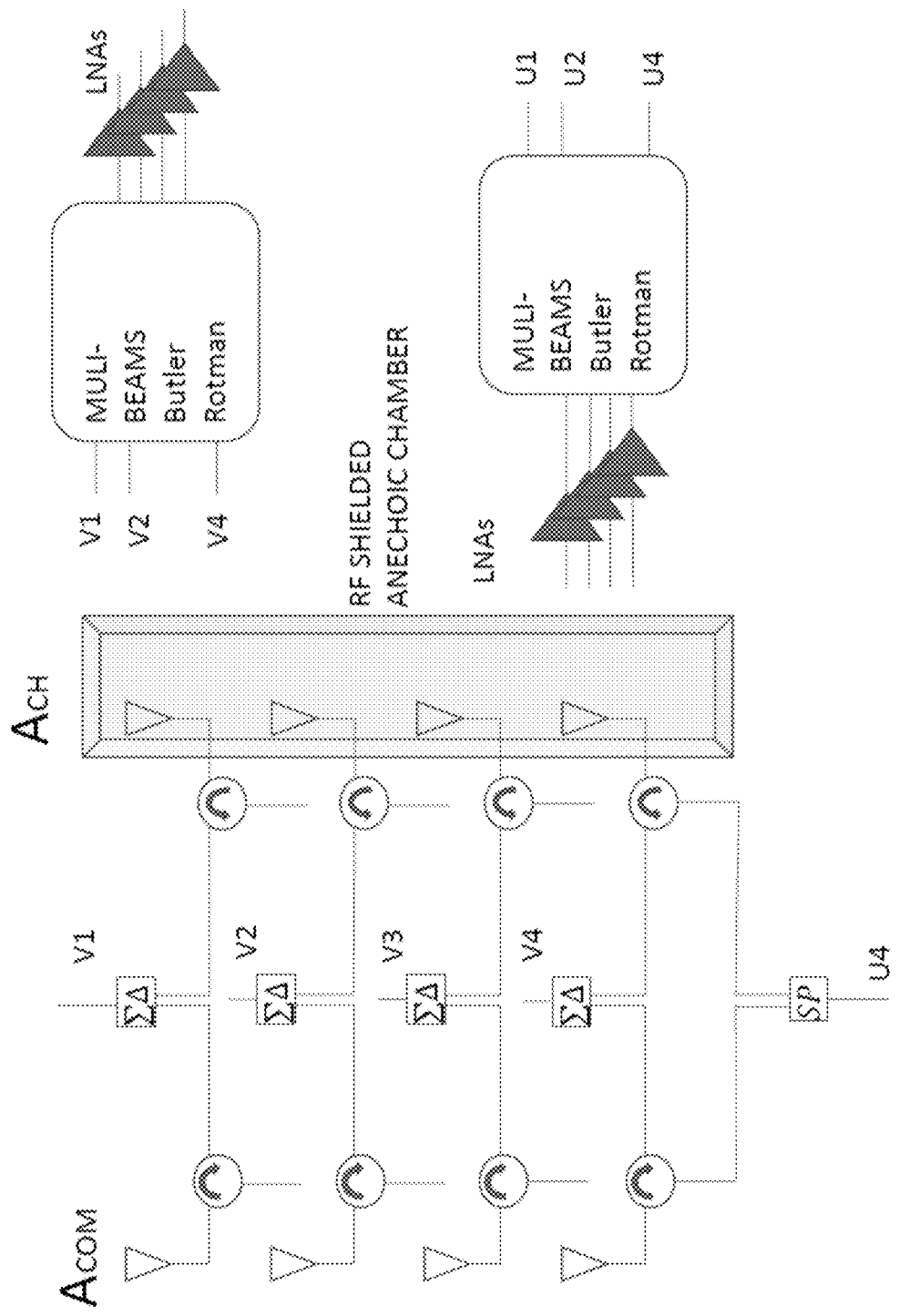
FIG. 2 shows a diagram of a multi-beam beamspace network with circulators and differential connections to two multi-beam microwave beamformer networks for wideband STAR operation, according to an embodiment of the subject invention. This system can include symmetrical connection of two identical arrays, where one array is used for communications (labeled as "$A_{COM}$" in FIG. 2) and the other array (labeled as ACH in FIG. 2) is housed inside an RF-shielded anechoic chamber (e.g., box) so that received signals do not reach the second array.

In one embodiment, a multi-beam beamspace network with circulators and differential connections to two multi-beam microwave beamformer networks for wideband STAR operation can be used, as depicted in FIG. 2. Physical symmetry can be utilized to mimic the near-field mutual coupling of the communication antenna array using an identical copy inside an RF-shielded box. By feeding the same signals used for transmission into the copy of the array inside the box, the near-field coupling can be exactly modeled and these coupled interference components can be subtracted out using passive microwave subtractors. This configuration allows nearly perfect cancellation of near-field coupling based self-interference but does not cancel environmental reflections. In order to address this issue, two passive microwave circuits can be inserted for multi-beam beamforming at the transmitter side and the receiver side of the MIMO radio.

Figure 3:
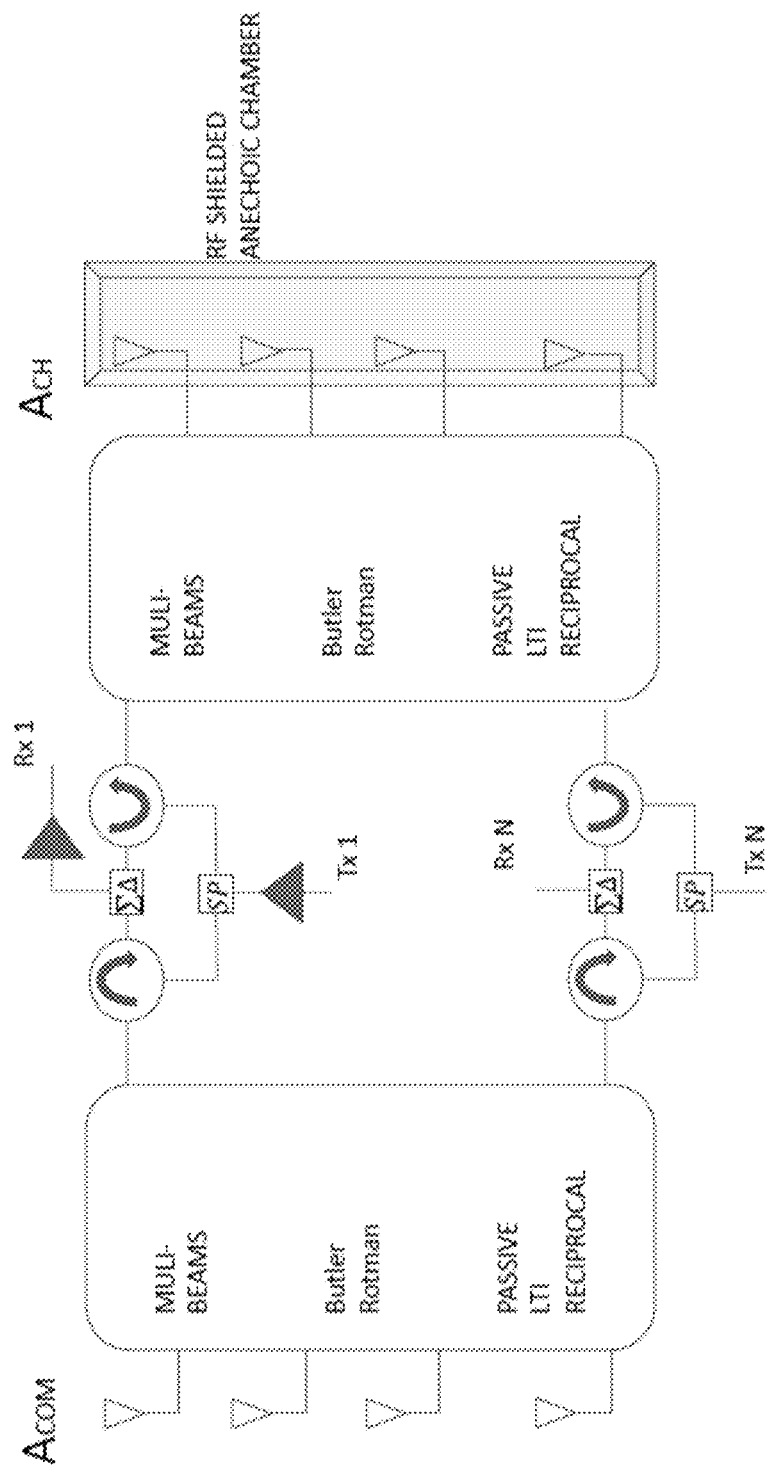
FIG. 3 shows a diagram of a multi-beam beamspace network with circulators and differential connections to two multi-beam microwave beamformer networks for wideband STAR operation, according to an embodiment of the subject invention. This system can include use of two arrays, two multi-beam microwave networks (e.g., of type Rotman, Luneberg, or Butler) and two sets of N circulators, connected in a differential configuration for self-interference subtraction (where N is an integer).

In one embodiment, a multi-beam beamspace network with circulators and differential connections to two multi-beam microwave beamformer networks for wideband STAR operation can be used, as depicted in FIG. 3. A fully-symmetrical pair of arrays, two multi-beam passive microwave beamforming networks, and two sets of N circulators can be used, as shown with transmit signals from each power amplifier (PA) split equally and fed to the circulators. The transmit signals are coupled in equal power and phase to the two passive multi-beam beamforming networks (e.g., Rotman, Luneberg, or Butler) and provide an exact replica of electromagnetic mutual coupling inside the RF-shielded anechoic chamber shown on the right-hand portion of FIG. 3. The received signals can be extracted through a subtraction process, as depicted in FIG. 3, which effectively cancels out wideband self-interference that arises due to array mutual coupling, due to coupling inside the passive beamformers, and/or non-ideal leakages of the circulators. The perfect physical symmetry allows simple subtraction of all non-ideal coupling, and the self-interference that occurred across the MIMO channels without resorting to active circuitry. The approach is fully linear, and has very low noise limited only by the thermal noise floor. Further, the system inherently supports beamspace MIMO and therefore allows the benefits of transmit mode beamforming, and receive mode gain, and the directional rejection of environmental reflection based self-interference from the receiver paths. Therefore, this technique cancels both self-interference caused by near-field coupling in each array as well as the far-field environmental reflections that return to the array. In addition, the approach cancels non-ideal circulator coupling and non-ideal coupling from the passive microwave beamformers. The performance is fundamentally limited by the isolation and matching of the subtractor and the balance of the power splitters.

Figure 4:
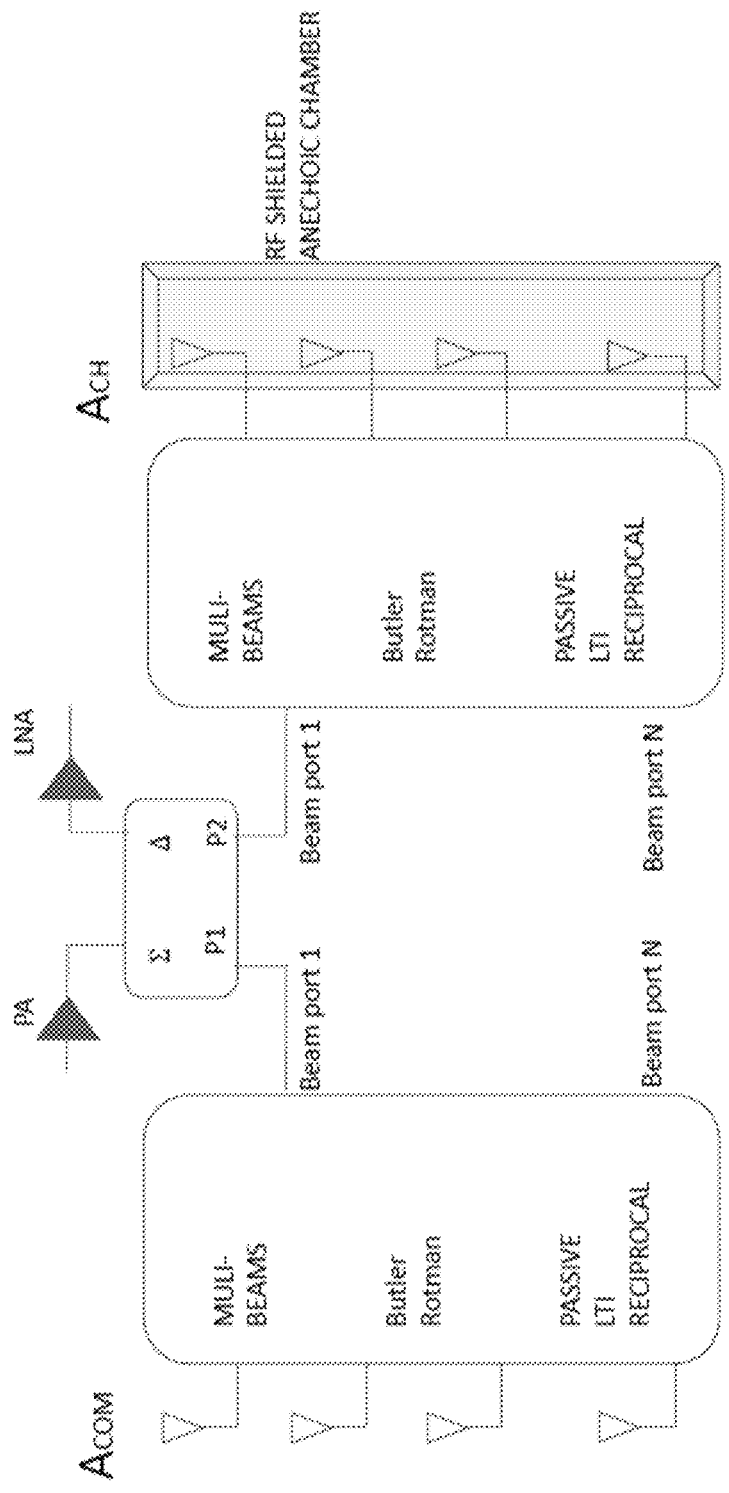
FIG. 4 shows a diagram of a multi-beam beamspace network with simplified circuitry for wideband STAR operation, according to an embodiment of the subject invention. This system can include use of 180-hybrids in place of circulators for reduced circuit complexity.

In one embodiment, a multi-beam beamspace network (similar to that of FIG. 3) can be used, but with simplified circuitry using only 180 hybrids in place of circulators, as depicted in FIG. 4. In this variant, the two circulators and the splitter can be replaced using a 4-port 180-hybrid coupler, thereby simplifying the design significantly. The 4-port device known as a 180-hybrid allows the Sigma ($\Sigma$) port signal to be equally split (3 dB) to P1 and P2. However, the $\Sigma$ port and the Delta ($\Delta$) port are isolated. The signals going into P1 and P2 are subtracted and appear at port $\Delta$. Therefore, bi-directional ports P1 and P2 can be used to connect to the arrays facing the environment and the RF shielded box. The $\Sigma$ port is driven by PAs and the $\Delta$ port is fed to LNAs for the receivers. By employing N number of 4-port 180-hybrids (where N is an integer), with high isolation between the $\Sigma$ and $\Delta$ ports, it is possible to facilitate cancellation of self-interference due to leakages in the multi-beam passive beamforming networks, the near-field mutual coupling between antenna elements in the arrays, and the self-interference from the environment (e.g., by at least 13.5 dB) due to the beamforming nature of the system. Further, the system naturally imparts 10 Log N gain in transmit and receive mode SNR due to the use of the multi-beam network.

With respect to narrowband applications for embodiments of the subject invention, the Butler matrix is well-known as a microwave realization of the Discrete Fourier Transform (DFT) for analog signals. The Butler matrix can be realized using mm-wave integrated circuits, printed circuit board (PCB)-based planar microwave circuits, or discrete phase-shifters and standard microwave components such as 180-hybrids, 90-hybrids, and/or splitter/combiners. With respect to wideband applications for embodiments of the subject invention, the Velay Vandermonde Matrix structure of true-time delay (TTD) multi-beam microwave passive beamformers are useful for wideband applications. The TTD multi-beam beamformer can be realized using microwave components and transmission line segments, planar microwave realizations, or Rotman lens, Luneberg lenses, and/or other TTD multi-beam passive microwave systems.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When ranges are used herein, such as for dose ranges, combinations and subcombinations of ranges (e.g., sub-ranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section, if present) are incorporated by reference in their entirety, including all figures and tables, to the extent they are not inconsistent with the explicit teachings of this specification.

What is claimed is:

1. A system for wireless simultaneous transmit and receive (STAR), the system comprising:
    at least one multi-input multi-output (MIMO) radiofrequency (RF) front-end,
    each MIMO RF front-end comprising:
        an RF-shielded anechoic chamber;
        a symmetrical pair of arrays comprising a first array configured for communication and a second array symmetrical to the first array and disposed within the RF-shielded chamber; and
        a pair of multi-beam beamforming networks in operable communication with the symmetrical pair of arrays,
    the second array being configured as a reference for subtracting self-interference between transmitters and receivers of the system,
    the pair of multi-beam beamforming networks comprising a first passive microwave multi-beam beamforming network and a second passive microwave multi-beam beamforming network identical to the first passive microwave multi-beam beamforming network,
    each of the first passive microwave multi-beam beamforming network and the second passive microwave multi-beam beamforming network being a Butler-Matrix based true-time delay microwave network, a Rotman lens based microwave network, or a Luneberg lens based microwave network,
    each of the first passive microwave multi-beam beamforming network and the second passive microwave multi-beam beamforming network comprising connected to each beam port thereof: a) a circulator and a differential connection; or b) a 180 hybrid coupler.

2. A method for wireless simultaneous transmit and receive (STAR), the method comprising:
    providing the system according to claim 1;
    utilizing the system to wirelessly transmit and receive signals simultaneously; and
    utilizing the second array as the reference for subtracting self-interference between transmitters and receivers of the system.

* * * * *